Patented Sept. 22, 1936

2,055,407

UNITED STATES PATENT OFFICE 2,055,407

METHOD OF PRODUCING COLORED PHOTOGRAPHIC MATERIALS

Béla Gáspár, Brussels, Belgium

No Drawing. Application March 7, 1935, Serial No. 9,899. In Germany August 10, 1933

8 Claims. (Cl. 95—7)

It is already known to color photographic colloids and emulsions for photographic and color photographic purposes. For this purpose there are usually employed water-soluble dyestuffs, which are fixed subsequently in the photographic layer, for example in the form of metallic salts, in order to prevent bleeding or diffusion of the dyestuff.

The invention relates to a method of producing photographic materials in which water-soluble dyestuffs are employed having the property of so coloring photographic colloids, and more particularly gelatines, that a diffusion or bleeding does not take place. These are the metallic compounds of organic dyestuffs, and more particularly azo dyestuffs, which contain hydroxyl groups and form a readily soluble complex with the metal, the metal oxide not being bound in the manner of a salt. Complexes of this nature are described, for example, by Fierz-David in "Künstliche Organische Farbstoffe", Berlin, 1926, page 46. They are obtainable on the market under different names, for example as Neolan dyestuffs or Lanasol dyes.

The dyestuffs included in my invention are stable complexes formed from metallic oxides and dyes containing hydroxyl groups and in particular the complexes formed from copper oxide and chromium oxide and azo dyes containing hydroxyl groups. In all of the complexes the metallic atom is not combined as a salt but appears to be within the "inner sphere" of the complex dye molecule. For example, the metal is not precipitated when the complex is treated with a dilute aqueous ammoniacal solution. The complex mordant dyestuffs are water soluble and do not show the direct presence of the metal.

Although various formulae of the dye complexes included in my invention have been suggested, no formulae have been generally accepted. Likewise, it is not apparent how the different complexes form various colored dyes.

These dyestuffs are of a fast kind, and are extremely suitable for color photographic purposes. In particular they are well adapted for the production of photographic materials which comprise a plurality of colored layers poured one upon the other or colored particles of emulsion obtained by re-emulsifying a plurality of colored emulsions. They are also suitable for the printing of photographic materials. The dyestuffs may also be employed in mixture or in adjacent layers in conjunction with the insoluble salts of acid dyestuffs.

Example 1

A silver halide photographic emulsion, which contains .5% neolan yellow R, is poured to form a layer. On to this layer there is poured a second layer containing .5% neolan pink G. The yellow layer is sensitized, for example, for green by means of pinaflavol, whilst the red layer is sensitized for red by means of ethyl violet. Upon the treatment of these layers in the photographic baths no diffusion will be observed even after lengthy immersion.

Example 2

The layers referred to in the first example may be employed in combination with an insoluble salt of a substantive dyestuff. Thus, for example, on to the double layer above referred to there may be poured a silver bromide solution containing the quinoline salt of diamine pure blue FF.

Example 3

In the case of a film coated on both sides there is applied to the one side an emulsion containing neolan pink B and neolan yellow R, and to the opposite side an emulsion containing neolan green BR. The orange colored emulsion is made sensitive for red and the green colored emulsion sensitive for blue. Exposure is performed according to a two-color selection image behind corresponding filters. The layer sensitized in respect of green is exposed behind a green filter, and the layer sensitized in respect of red behind a red filter.

After developing and fixing the superfluous dyestuff is destroyed at the points of the silver deposit by means of an acid thiocarbamide solution. Since in this case a so-called reversed image is obtained, the master images require to be negatives. It is, of course, also possible to destroy the dyestuff in other manner, such as set forth for example in my Patent No. 2,020,775, dated November 12, 1935. The sensitization is described in my prior Patent No. 1,985,344, dated December 25, 1934.

What I claim as new and desire to secure by Letters Patent is:

1. In a method of producing colored photographic materials having colors which are substantially unaffected by photographic treating baths, the step which comprises coloring a light sensitive silver halide colloid with a water soluble metal complex of a hydroxy dyestuff selected from the group of organic dyestuffs containing a metal atom in a non-ionizable linkage with the organic dyestuff molecule, said complex being stable in a dilute aqueous ammoniacal solution.

2. In a method of producing colored photographic materials having colors which are substantially unaffected by photographic treating baths, the step which comprises coloring a light sensitive silver halide emulsion with a water soluble metal complex of a hydroxy dyestuff selected from the group of organic dyestuffs containing a metal atom in a non-ionizable linkage with the organic dyestuff molecule, said complex being stable in a dilute aqueous ammoniacal solution.

3. In a method of producing colored photographic materials having colors which are substantially unaffected by photographic treating baths, the step which comprises coloring a light sensitive silver halide emulsion with a water soluble metal complex of a hydroxy azo-dye containing a metal atom in a non-ionizable linkage with the dyestuff molecule, said complex being stable in a dilute aqueous ammoniacal solution.

4. In a method of producing colored photographic materials having colors which are substantially unaffected by photographic treating baths, the step which comprises coloring a light sensitive silver halide emulsion with a water soluble metal complex of a hydroxy dyestuff selected from the group of organic dyestuffs which contain a metal atom in a non-ionizable linkage with the organic dyestuff molecule, said complex being stable in a dilute aqueous ammoniacal solution, the metal in said complex having an atomic weight between 52 and 65.

5. In a method of producing colored photographic materials having colors which are substantially unaffected by photographic treating baths, the step which comprises coloring a light sensitive silver halide colloid with a water soluble metal complex of a hydroxy azo-dyestuff containing a metal atom in a non-ionizable linkage with the dyestuff molecule, said complex being stable in a dilute aqueous ammoniacal solution, the metal in said complex comprising one of the group consisting of copper and chromium.

6. In a method of producing colored photographic materials having colors which are substantially unaffected by photographic treating baths, the step which comprises coloring a light sensitive silver halide emulsion with a water soluble copper complex of a hydroxy azo-dye having the metal atom in a non-ionizable linkage with the dyestuff molecule, said complex being stable in a dilute aqueous ammoniacal solution.

7. In a method of producing colored photographic materials having colors which are substantially unaffected by photographic treating baths, the step which comprises coloring a light sensitive silver halide emulsion with a water soluble chromium complex of a hydroxy azo-dye having the metal atom in a non-ionizable linkage with the dyestuff molecule, said complex being stable in a dilute aqueous ammonical solution.

8. A non-bleeding multi-layer photographic material comprising a support and a plurality of differently colored light sensitive silver halide colloidal layers on said support, at least one of said colloidal layers containing a fast dyestuff comprising a water soluble metal complex of a hydroxy azo-dyestuff containing a metal atom in a non-ionizable linkage with the dyestuff molecule, said complex being stable in a dilute aqueous ammoniacal solution.

BÉLA GÁSPÁR.